(12) United States Patent
Kawada et al.

(10) Patent No.: US 12,230,794 B2
(45) Date of Patent: Feb. 18, 2025

(54) SECONDARY BATTERY POSITIVE ELECTRODE ACTIVE MATERIAL, AND SECONDARY BATTERY

(71) Applicant: Panasonic Intellectual Property Management Co., Ltd., Osaka (JP)

(72) Inventors: Hiroshi Kawada, Hyogo (JP); Kosuke Kuroda, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 588 days.

(21) Appl. No.: 17/604,654

(22) PCT Filed: Apr. 16, 2020

(86) PCT No.: PCT/JP2020/016666
§ 371 (c)(1),
(2) Date: Oct. 18, 2021

(87) PCT Pub. No.: WO2020/218136
PCT Pub. Date: Oct. 29, 2020

(65) Prior Publication Data
US 2022/0216467 A1 Jul. 7, 2022

(30) Foreign Application Priority Data
Apr. 26, 2019 (JP) .................. 2019-085367

(51) Int. Cl.
*H01M 4/505* (2010.01)
*H01M 4/02* (2006.01)
*H01M 4/525* (2010.01)

(52) U.S. Cl.
CPC ........... *H01M 4/505* (2013.01); *H01M 4/525* (2013.01); *H01M 2004/028* (2013.01)

(58) Field of Classification Search
CPC ................. H01M 4/505; H01M 4/525; H01M 2004/028; H01M 4/131; H01M 10/0525;
(Continued)

(56) References Cited

U.S. PATENT DOCUMENTS

| 6,103,422 A | 8/2000 | Kanai |
| 2013/0230775 A1 | 9/2013 | Endo |

(Continued)

FOREIGN PATENT DOCUMENTS

| CN | 103296268 A | 9/2013 |
| EP | 2634148 A1 | 9/2013 |

(Continued)

OTHER PUBLICATIONS

English Translation of Chinese Search Report dated May 31, 2023 for the related Chinese Patent Application No. 202080021967.1.
(Continued)

*Primary Examiner* — Helen Oi K Conley
(74) *Attorney, Agent, or Firm* — WHDA, LLP

(57) ABSTRACT

This lithium transition metal composite oxide, which configures a secondary battery positive electrode active material, is a composite oxide represented by general formula $Li_\alpha[Li_xMn_yCo_zMe_{(1-x-y-z)}]O_2$ (in the formula, Me is at least one species selected from Ni, Fe, Ti, Bi and Nb, and $0.5<\alpha<1$, $0.05<x<0.25$, $0.4<y<0.7$, and $0<z<0.25$), and has at least one crystal structure selected from the O2 structure, the T2 structure and the O6 structure. The ratio (Co2/Co1) of the Co molar fraction (Co2) in the surface of the oxide to the Co molar fraction (Co1) in the entire lithium transition metal composite oxide is $1.2<(Co2/Co1)<6.0$.

5 Claims, 1 Drawing Sheet

(58) Field of Classification Search
CPC .............. C01P 2002/22; C01P 2004/80; C01P 2006/40; C01G 53/50; Y02E 60/10
See application file for complete search history.

(56) References Cited

U.S. PATENT DOCUMENTS

| | | |
|---|---|---|
| 2015/0093646 A1 | 4/2015 | Kawada |
| 2016/0056460 A1 | 2/2016 | Kawada et al. |
| 2016/0181611 A1 | 6/2016 | Cho et al. |
| 2016/0351901 A1 | 12/2016 | Saito |

FOREIGN PATENT DOCUMENTS

| | | |
|---|---|---|
| JP | 10-236826 A | 9/1998 |
| JP | 2003-59489 A | 2/2003 |
| JP | 2008-84652 A | 4/2008 |
| JP | 2012-204281 A | 10/2012 |
| JP | 2013-182782 A | 9/2013 |
| JP | 2014-186937 A | 10/2014 |
| JP | 2015-92455 A | 5/2015 |
| WO | 97/23918 A1 | 7/1997 |
| WO | 2014/155988 A1 | 10/2014 |
| WO | 2015/115025 A1 | 8/2015 |

OTHER PUBLICATIONS

International Search Report dated Jun. 30, 2020, issued in counterpart International Application No. PCT/JP2020/016666. (3 pages).
Extended (Supplementary) European Search Report dated May 31, 2022, issued in counterpart EP application No. 20793967.9. (7 pages).
Hua et al., "Study of full concentration-gradient Li(Ni0.8Co0.1Mn0.1)O2 cathode material for lithium ion batteries", Journal of Alloys and Compounds, 2014, vol. 614, pp. 264-270, cited in EP Extended European Search Report dated May 31, 2022. (7 pages).
Liang et al., "Synthesis and characterization of full concentration-gradient LiNi0.7Co0.1Mn0.2O2 cathode material for lithium-ion batteries", Journal of Alloys and Compounds, 2015, vol. 635, pp. 92-100, cited in EP Extended European Search Report dated May 31, 2022. (9 pages).

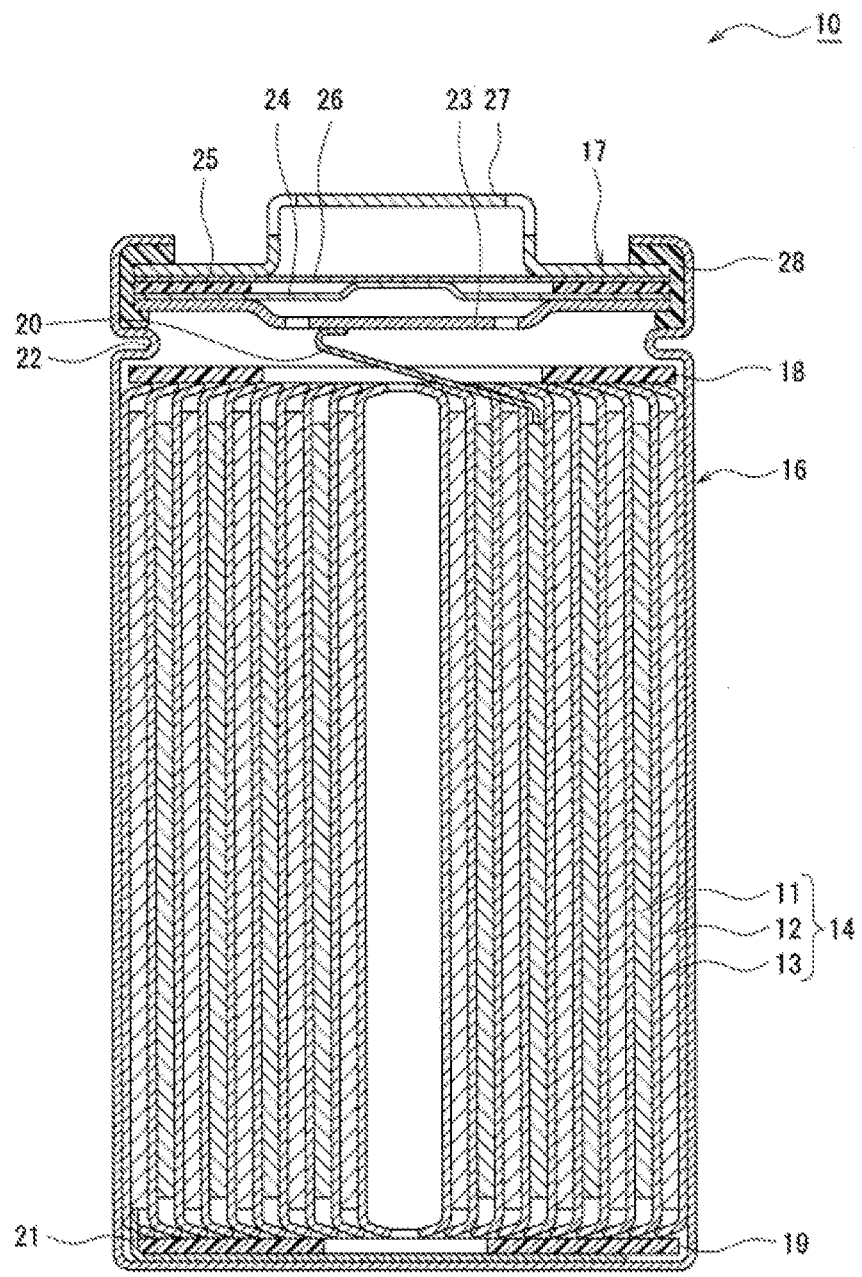

SECONDARY BATTERY POSITIVE ELECTRODE ACTIVE MATERIAL, AND SECONDARY BATTERY

TECHNICAL FIELD

The present disclosure relates to a positive electrode active material for secondary battery, and a secondary battery using the positive electrode active material.

BACKGROUND

Conventionally, a lithium transition metal composite oxide is widely used as a positive electrode active material for a secondary battery such as a lithium ion battery. For example, Patent Literature 1 discloses a lithium transition metal composite oxide having a crystal structure defined by an O2 structure and containing Li in the transition metal layer. There is also known a lithium transition metal composite oxide having a crystal structure defined by an O3 structure, which contains lithium in the transition metal layer. A lithium transition metal composite oxide which contains lithium in the transition metal layer is generally referred to as a lithium-rich composite oxide.

CITATION LIST

Patent Literature

PATENT LITERATURE 1: Japanese Unexamined Patent Application Publication No. 2012-204281

SUMMARY

However, there are difficulties in realizing high capacity with a Li-rich lithium transition metal composite oxide having an O3 structure, because the transition metal migrates during charging and discharging and hinders movement of Li. On the other hand, with a conventional Li-rich lithium transition metal composite oxide having an O2 structure as disclosed in Patent Literature 1, although migration of the transition metal can be suppressed, it is considered that oxygen desorption occurs during charging, so that there still is room for improvement for achieving high capacity. Further, a positive electrode active material desirably has a high capacity retention rate after charge/discharge cycles, and excellent cycle characteristics.

A positive electrode active material for secondary battery according to one aspect of the present disclosure is a secondary battery positive electrode active material containing a lithium transition metal composite oxide. The lithium transition metal composite oxide is represented by general formula $Li_\alpha[Li_xMn_yCo_zMe_{(1-x-y-z)}]O_2$ (where Me is at least one selected from Ni, Fe, Ti, Bi, and Nb, and $0.5<\alpha<1$, $0.05<x<0.25$, $0.4<y<0.7$, and $0<z<0.25$ hold true), and has at least one crystal structure selected from O2 structure, T2 structure, and O6 structure. A ratio (Co2/Co1) of a Co molar ratio (Co2) at a surface of the oxide to a Co molar ratio (Co1) in the entire lithium transition metal composite oxide satisfies $1.2<(Co2/Co1)<6.0$.

A secondary battery according to one aspect of the present disclosure includes a positive electrode containing the above-described positive electrode active material, a negative electrode, and an electrolyte.

By means of the positive electrode active material according to one aspect of the present disclosure, it is possible to provide a secondary battery having a high capacity and excellent cycle characteristics.

BRIEF DESCRIPTION OF DRAWINGS

FIG. 1 is a cross-sectional view of a non-aqueous electrolyte secondary battery according to an example embodiment.

DESCRIPTION OF EMBODIMENTS

As a result of conducting diligent studies to solve the above-mentioned problems, with a lithium transition metal composite oxide which has at least one crystal structure selected from O2 structure, T2 structure, and O6 structure and which is represented by the above-noted general formula, the present inventors succeeded in simultaneously achieving high capacity and good cycle characteristics by setting the Co molar ratios to satisfy $1.2<(Co2/Co1)<6.0$ and accordingly having Co unevenly densely distributed at the surface of the oxide particles. It is considered that oxygen desorption is suppressed and capacity is improved due to the effect of Co unevenly densely distributed at the surface of the oxide particles.

The positive electrode active material for secondary battery according to the present disclosure and an example embodiment of a secondary battery using the positive electrode active material will now be described in detail. Although a cylindrical battery in which a spiral-type electrode assembly 14 is housed in a bottomed cylindrical outer can 16 is described below as an example, the outer housing is not limited to a cylindrical outer can, and may for example be a rectangular outer can, or may be an outer housing made of a laminate sheet including a metal layer and a resin layer. Further, the electrode assembly may be a laminate-type electrode assembly in which a plurality of positive electrodes and a plurality of negative electrodes are alternately laminated via separators.

FIG. 1 is a cross-sectional view of a secondary battery 10 according to an example embodiment. As shown for example in FIG. 1, the secondary battery 10 comprises a spiral-type electrode assembly 14, an electrolyte, and an outer can 16 that houses the electrode assembly 14 and the electrolyte. The electrode assembly 14 includes a positive electrode 11, a negative electrode 12, and separators 13, and has a winding structure in which the positive electrode 11 and the negative electrode 12 are wound in a spiral shape with the separators 13 located between the electrodes 11, 12. The outer can 16 is a bottomed cylindrical metal container having an opening on one side in the axial direction, and the opening of the outer can 16 is closed off by a sealing assembly 17. In the following, for convenience of explanation, the sealing assembly 17 side of the battery is described as the top, and the bottom portion side of the outer can 16 is described as the bottom.

The electrolyte may be an aqueous electrolyte, but preferably is a non-aqueous electrolyte containing a non-aqueous solvent and an electrolyte salt dissolved in the non-aqueous solvent. As the non-aqueous solvent, for example, an ester, an ether, a nitrile, an amide, a mixed solvent containing two or more of the foregoing, or the like is used. The non-aqueous solvent may contain a halogen-substituted product obtained by substituting at least a part of the hydrogens in the above solvents with halogen atoms such as fluorine. As the electrolyte salt, for example, a lithium salt such as $LiPF_6$ is used. The electrolyte is not limited to a liquid electrolyte, and may be a solid electrolyte using a gel polymer or the like.

The positive electrode 11, the negative electrode 12, and the separators 13, which constitute the electrode assembly 14, are all long strip-shaped members, and are alternately laminated in the radial direction of the electrode assembly 14 by being wound in a spiral shape. The negative electrode 12 is formed to have a size somewhat larger than that of the positive electrode 11 in order to prevent precipitation of lithium. That is, the negative electrode 12 is formed longer than the positive electrode 11 in the length direction and in the width direction (or the short-side direction). The two separators 13 are formed somewhat larger than at least the positive electrode 11, and are arranged so as to, for example, sandwich the positive electrode 11. Further, the electrode assembly 14 includes a positive electrode lead 20 connected to the positive electrode 11 by welding or the like, and a negative electrode lead 21 connected to the negative electrode 12 by welding or the like.

Insulation plates 18 and 19 are respectively arranged above and below the electrode assembly 14. In the example shown in FIG. 1, the positive electrode lead 20 extends through a through hole in the insulation plate 18 and toward the sealing assembly 17, while the negative electrode lead 21 extends outside the insulation plate 19 and toward the bottom portion of the outer can 16. The positive electrode lead 20 is connected to the lower surface of an internal terminal plate 23 of the sealing assembly 17 by welding or the like, and a cap 27, which is the top plate of the sealing assembly 17 electrically connected to the internal terminal plate 23, serves as the positive electrode terminal. The negative electrode lead 21 is connected to the inner surface of the bottom portion of the outer can 16 by welding or the like, and the outer can 16 serves as the negative electrode terminal.

A gasket 28 is provided between the outer can 16 and the sealing assembly 17 so as to ensure airtightness inside the battery. The outer can 16 has formed thereon a grooved portion 22, in which a part of a side surface portion protrudes inward and supports the sealing assembly 17. The grooved portion 22 is preferably formed in an annular shape along the circumferential direction of the outer can 16, and supports the sealing assembly 17 on its upper surface. The sealing assembly 17 is fixed to an upper part of the outer can 16 by means of the grooved portion 22 and an opening end portion of the outer can 16 which is crimped to the sealing assembly 17.

The sealing assembly 17 has a structure obtained by laminating, in order from the electrode assembly 14 side, the internal terminal plate 23, a lower valve member 24, an insulation member 25, an upper valve member 26, and the cap 27. Each of the members constituting the sealing assembly 17 has, for example, a disk shape or a ring shape, and the respective members except the insulation member 25 are mutually electrically connected.

The lower valve member 24 and the upper valve member 26 are connected to each other at their central portions, and the insulation member 25 is interposed between peripheral edge portions of these valve members. When the internal pressure of the battery increases due to abnormal heat generation, the lower valve member 24 deforms and ruptures in a manner pushing up the upper valve member 26 toward the cap 27, and the current path between the lower valve member 24 and the upper valve member 26 is thereby cut off. When the internal pressure increases further, the upper valve member 26 ruptures, and gas is discharged from an opening in the cap 27.

A detailed description will now be given regarding the positive electrode 11, the negative electrode 12, and the separators 13, which constitute the electrode assembly 14, and in particular regarding a positive electrode active material constituting the positive electrode 11.

[Positive Electrode]

The positive electrode 11 comprises a positive electrode core, and a positive electrode mixture layer provided on a surface of the positive electrode core. For the positive electrode core, it is possible to use: a foil of a metal that is stable in the potential range of the positive electrode 11, such as aluminum; a film having such a metal disposed on its surface layer; and the like. The positive electrode mixture layer contains a positive electrode active material, a binder, and a conductive material, and is preferably provided on both sides of the positive electrode core excluding the portion to which the positive electrode lead 20 is connected. The positive electrode 11 can be produced by, for example, applying a positive electrode mixture slurry containing the positive electrode active material, the binder, the conductive material, and the like onto the surfaces of the positive electrode core, drying the applied films, and then compressing the films to thereby form positive electrode mixture layers on both sides of the positive electrode core.

Examples of the conductive material contained in the positive electrode mixture layer include carbon materials such as carbon black, acetylene black, Ketjen black, and graphite. Examples of the binder contained in the positive electrode mixture layer include fluororesins such as polytetrafluoroethylene (PTFE) and polyvinylidene fluoride (PVdF), polyacrylonitrile (PAN), polyimides, acrylic resins, polyolefins, and so on. These resins may be used in combination with cellulose derivatives such as carboxymethyl cellulose (CMC) or salts thereof, polyethylene oxide (PEO), and the like.

The positive electrode active material is composed of a lithium transition metal composite oxide. The lithium transition metal composite oxide is represented by general formula $Li_\alpha[Li_xMn_yCo_zMe_{(1-x-y-z)}]O_2$ (where Me is at least one selected from Ni, Fe, Ti, Bi, and Nb, and $0.5<\alpha<1$, $0.05<x<0.25$, $0.4<y<0.7$, and $0<z<0.25$ hold true), and has at least one crystal structure selected from O2 structure, T2 structure, and O6 structure. As described in detail further below, a ratio (Co2/Co1) of the Co molar ratio (Co2) at the surface of the oxide to the Co molar ratio (Co1) in the entire lithium transition metal composite oxide satisfies $1.2<(Co2/Co1)<6.0$.

While the present embodiment will be described assuming that the positive electrode active material contains only the above-noted lithium transition metal composite oxide (hereinafter referred to as "the composite oxide A"), the positive electrode active material may contain compounds other than the composite oxide A so long as the object of the present disclosure is not undermined.

The positive electrode active material (i.e., the composite oxide A) is particles having a volume-based median diameter (D50) of, for example, 3 to 30 µm, and preferably 5 to 25 µm. A volume-based D50 means a particle size at which, in a volume-based particle size distribution, the cumulative frequency from the smaller particle size side is 50%, and is also called a mid-level diameter. The D50 can be measured by means of a laser diffraction type particle size distribution measuring device (e.g., Microtrac HRA manufactured by Nikkiso Co., Ltd.) and by using water as a dispersion medium.

The composite oxide A has at least one crystal structure selected from O2 structure, T2 structure, and O6 structure. Preferably, the main crystal structure is the O2 structure. For example, at least 50 vol. % of the crystal structure of the composite oxide A, or substantially the entirety thereof, has the O2 structure. Here, the O2 structure is a layered crystal structure in which lithium is present in the center of an oxygen octahedron, in which two manners of overlap between oxygen and transition metals exist per unit cell, and which belongs to the space group P6$_3$mc. Such a layered crystal structure has a lithium layer, a transition metal layer, and an oxygen layer. Referring to the above-noted general formula of the composite oxide A, the lithium layer contains Li$_a$, the transition metal layer contains Li$_x$Mn$_y$Co$_z$Me$_{(1-x-y-z)}$, and the oxygen layer contains O$_2$.

When synthesizing the composite oxide A having the O2 structure, composite oxides having the T2 structure and the O6 structure may be synthesized at the same time as by-products. As noted above, the composite oxide A may contain composite oxides having the T2 structure and the O6 structure which are synthesized as by-products. Here, the T2 structure is a layered crystal structure in which lithium is present in the center of an oxygen tetrahedron, in which two manners of overlap between oxygen and transition metals exist per unit cell, and which belongs to the space group Cmca. The O6 structure is a layered crystal structure in which lithium is present in the center of an oxygen octahedron, in which six manners of overlap between oxygen and transition metals exist per unit cell, and which belongs to the space group R-3m.

In the composite oxide A, Li contained in the transition metal layer is present by more than 5 mol % and less than 25 mol %, and preferably more than 8 mol % and less than 20 mol %, relative to the total number of moles of the metal elements contained in the transition metal layer. When the Li content is 5 mol % or less or 25 mol % or more, high capacity cannot be maintained. Further, the Mn content is more than 40 mol % and less than 70 mol %, and preferably more than 45 mol % and less than 65 mol %, relative to the total number of moles of the metal elements contained in the transition metal layer. The Co content is more than 0 mol % and less than 25 mol %, and preferably more than 3 mol % and less than 20 mol %, relative to the total number of moles of the metal elements contained in the transition metal layer. When the Mn content and the Co content are beyond the above-noted ranges, high capacity cannot be maintained.

The metal element Me other than Li, Mn, and Co contained in the composite oxide A is preferably at least one selected from Ni, Fe, Ti, Bi, and Nb. Among these, Ni and Fe are preferable. The Me content is preferably more than 3 mol % and less than 20 mol % relative to the total number of moles of the metal elements contained in the transition metal layer. The composite oxide A may contain metal elements other than the above so long as the object of the present disclosure is not undermined.

As described above, the composite oxide A is a composite oxide in which a ratio (Co2/Co1) of the Co molar ratio (Co2) at the particle surface of the composite oxide A to the Co molar ratio (Co1) in the entire particle satisfies the condition 1.2<(Co2/Co1)<6.0. For example, in the composite oxide A, the Co content at the particle surface is more than 1.2 times and less than 6.0 times the Co content at the central portion of the particle. The composite oxide A may have a concentration distribution in which the concentration of Co gradually increases from the central portion of the particle toward the surface, or may have a concentration distribution in which the concentration of Co increases sharply at the particle surface and in the vicinity of the surface. The concentration distribution region where the Co concentration is increased has a thickness of preferably 20 nm or greater, and more preferably 100 nm or greater, from toward the surface of the particle. When the thickness of the region in which the Co concentration is higher than in the other regions is less than 20 nm from the particle surface of the composite oxide A, sufficient advantageous effects may not be obtained.

It is considered that oxygen desorption is suppressed and capacity is improved by allowing Co to be present more at the surface of the composite oxide A than inside the particle. When Co2/Co1 is 1.2 or lower, the effect of capacity improvement cannot be obtained. Further, the effect of capacity improvement cannot be obtained also when Co2/Co1 is set to 6.0 or greater and accordingly the amount of Co present at the particle surface becomes too large, i.e., the amount of Co present inside the particle becomes too small. When a Co concentration distribution in which Cot/Co1 is higher than 1.2 and lower than 6.0 is provided, capacity is specifically improved.

In the present specification, a Co molar ratio means a ratio of the number of moles of Co to the total number of moles of metal elements excluding Li. In other words, a Co molar ratio is calculated by: Co molar ratio=Number of moles of Co/(Total number of moles of Mn+Co+Me). The number of moles of metal elements in the entire particle of the composite oxide A is measured by inductively coupled plasma (ICP) optical emission spectroscopy, and the number of moles of metal elements at the particle surface of the composite oxide A is measured by X-ray photoelectron spectroscopy (XPS).

Co2/Co1 is more preferably higher than 2.0 and lower than 6.0, and particularly preferably higher than 2.5 and lower than 5.5. Further, the valence (or formal oxidation number) of Co contained in the composite oxide A is preferably less than 3. In that case, an increase in battery capacity and improvement in cycle characteristics can be easily achieved. For example, the valence of Co is less than 3 as calculated assuming that Me in the above general formula is Ni, Ni is divalent, Mn is tetravalent, and O is divalent. The valence of Co is more preferably less than 2.90, and particularly preferably less than 2.85.

Further, in the composite oxide A, a ratio (Mn2/Mn1) of the Mn molar ratio (Mn2) at the surface of the composite oxide A to the Mn molar ratio (Mn1) in the entirety thereof preferably satisfies 0.3<(Mn2/Mn1)<1.0. That is, Mn is present more on the inside of the particle than at the particle surface of the composite oxide A. In that case, an increase in battery capacity and improvement in cycle characteristics can be easily achieved. In the present specification, a Mn molar ratio means a ratio of the number of moles of Mn to the total number of moles of metal elements excluding Li, and is calculated by: Mn molar ratio=Number of moles of Mn/(Total number of moles of Mn+Co+Me).

For example, in the composite oxide A, the Mn content at the particle surface is more than 0.5 times and less than 1.0 times the Mn content at the central portion of the particle. The composite oxide A may have a concentration distribution in which the concentration of Mn gradually decreases from the central portion of the particle toward the surface, or may have a concentration distribution in which the concentration of Mn decreases sharply at the particle surface and in the vicinity of the surface. Mn2/Mn1 is more preferably higher than 0.55 and lower than 0.85, and particularly preferably higher than 0.60 and lower than 0.80.

The metal element Me, such as Ni, contained in the composite oxide A may be unevenly densely distributed at the surface of the particle, but is preferably present in the entire particle at a substantially uniform concentration.

The composite oxide A can be synthesized by, for example, subjecting a sodium transition metal composite oxide containing at least Mn and Co to ion exchange so as to replace Na with Li, and then further processing the product by adding a lithium salt having high reactivity with Co. An example method of the ion exchange is a method in which, to a sodium transition metal composite oxide, a molten salt bed of lithium salt is added and heated. Here, the ion exchange may not proceed completely, and a certain amount of Na may remain. As the lithium salt, it is preferable to use at least one selected from lithium nitrate, lithium sulfate, lithium chloride, lithium carbonate, and the like. Further, the ion exchange may be performed by immersing the sodium transition metal composite oxide in a solution containing at least one lithium salt. Examples of the lithium salt having high reactivity with Co, which is added after the ion exchange, include lithium hydroxide, lithium iodide, lithium bromide, and the like. By adding these salts after the ion exchange and by heating, Co can selectively be unevenly densely distributed at the surface. The step of adding the lithium salt having high reactivity with Co after the ion exchange may be carried out after completion of the ion exchange by adding the lithium salt having high reactivity with Co in addition to the molten salt bed used for the ion exchange, or the step may be carried out subsequent to removing the molten salt bed using water after completion of the ion exchange.

The composite oxide A can also be produced by adhering, to the surface of mother particles having the composition represented by the above-noted general formula, fine particles having a higher Co content than the mother particles. As a method for fixing the fine particles, it is possible to use a conventionally known method such as a mechanochemical method or a surface coating method.

[Negative Electrode]

The negative electrode 12 comprises a negative electrode core and a negative electrode mixture layer provided on a surface of the negative electrode core. For the negative electrode core, it is possible to use: a foil of a metal that is stable in the potential range of the negative electrode 12, such as copper; a film having such a metal disposed on its surface layer; and the like. The negative electrode mixture layer contains a negative electrode active material and a binder, and is preferably provided, for example, on both sides of the negative electrode core excluding the portion to which the negative electrode lead 21 is connected. The negative electrode 12 can be produced by, for example, applying a negative electrode mixture slurry containing the negative electrode active material, the binder, and the like onto the surfaces of the negative electrode core, drying the applied films, and then compressing the films to thereby negative electrode mixture layers on both sides of the negative electrode core.

As the negative electrode active material, the negative electrode mixture layer contains, for example, a carbon-based active material that reversibly occludes and releases lithium ions. Preferred carbon-based active materials are graphite including natural graphite such as scaly graphite, massive graphite, and earthy graphite, and artificial graphite such as massive artificial graphite (MAG) and graphitized mesophase carbon microbeads (MCMB). Further, as the negative electrode active material, a Si-based active material composed of at least one of Si and a Si-containing compound may be used. A carbon-based active material and a Si-based active material may be used in combination.

As the binder contained in the negative electrode mixture layer, fluororesins, PAN, polyimides, acrylic resins, polyolefins, and the like can be used as with the positive electrode 11, but styrene-butadiene rubber (SBR) is preferably used. Further, the negative electrode mixture layer preferably additionally contains CMC or a salt thereof, polyacrylic acid (PAA) or a salt thereof, polyvinyl alcohol (PVA), or the like. Among the foregoing, use of SBR in combination with CMC or a salt thereof or PAA or a salt thereof is preferred.

[Separator]

As the separator 13, a porous sheet having ion permeability and insulating property is used. Specific examples of the porous sheet include a microporous thin film, a woven fabric, and a non-woven fabric. As the material of the separator 13, olefin resins such as polyethylene and polypropylene, cellulose, and the like are preferred. The separator 13 may have either a single-layer structure or a laminated structure. A heat-resistant layer or the like may be formed on the surface of the separator.

EXAMPLES

While the present disclosure will now be described further using Examples, the present disclosure is not limited to these Examples.

Example 1

[Synthesis of Positive Electrode Active Material]

$NiSO_4$, $CoSO_4$, and $MnSO_4$ were mixed in an aqueous solution so as to attain a stoichiometric ratio of 13.5:13.5:73, and co-precipitation was allowed to occur, so that (Ni, Co, Mn)(OH)$_2$ serving a precursor was obtained. Next, this precursor, $Na_2CO_3$, and $LiOH.H_2O$ were mixed such that (Ni+Co+Mn):Na:Li satisfied a stoichiometric ratio of 87:83:13, and additional $LiOH.H_2O$ was further mixed. Subsequently, this mixture was maintained at 900° C. for 10 hours, and a sodium composite oxide was thereby synthesized.

The composition of the obtained sodium composite oxide was analyzed using an inductively coupled plasma (ICP) optical emission spectroscopic analyzer (product name "iCAP6300", manufactured by Thermo Fisher Scientific). The results showed that Na:Li:Mn:Co:Ni=0.756:0.133:0.633:0.117:0.117.

Next, to 5 g of the synthesized sodium composite oxide, a molten salt bed obtained by mixing lithium nitrate and lithium chloride at a molar ratio of 88:12 was added by a 5 times equivalent amount (i.e., 25 g). Subsequently, the mixture was maintained at 280° C. for 2 hours, so that Na of the sodium composite oxide was ion-exchanged with Li. A lithium-excessive type lithium composite oxide ($Li_2MnO_3$-$LiMO_2$ solid solution) was thereby prepared.

Next, with respect to the mixture in which the ion exchange was completed, lithium iodide was mixed at an atomic ratio of 20% relative to the lithium composite oxide obtained by the ion exchange. Further, by maintaining the mixture at 280° C. for 1 hour, Co in the composite oxide was caused to react with the lithium iodide. A lithium transition metal composite oxide (i.e., a positive electrode active material) having Co unevenly densely distributed at the particle surface was thereby synthesized.

The composition of the obtained composite oxide was analyzed using an inductively coupled plasma (ICP) optical emission spectroscopic analyzer (product name "iCAP6300", manufactured by Thermo Fisher Scientific). The results showed that Li:Mn:Co:Ni=1.13:0.724:0.137: 0.139. In addition, the composition of the transition metals at the surface of the composite oxide was analyzed by X-ray photoelectron spectroscopy (XPS, using AlKα radiation source). The results showed that Mn:Co:Ni=0.553:0.289: 0.158.

[Preparation of Positive Electrode]

A positive electrode mixture slurry was prepared by mixing the synthesized positive electrode active material, acetylene black, and polyvinylidene fluoride (PVdF) at a mass ratio of 92:5:3, and by using N-methyl-2-pyrrolidone (NMP) as a dispersion medium. Next, this positive electrode mixture slurry was applied to a surface of a positive electrode core made of aluminum foil. The applied film was dried and compressed, and then cut into a predetermined electrode size. A positive electrode having a positive electrode mixture layer formed on the positive electrode core was thereby prepared.

[Preparation of Non-Aqueous Electrolyte Solution]

Into a mixed solvent prepared by mixing fluoroethylene carbonate (FEC) and methyl 3,3,3-trifluoropropionate (FMP) at a mass ratio of 1:3, $LiPF_6$ was dissolved at a concentration of 1 mol/L, and a non-aqueous electrolyte solution was thereby prepared.

[Preparation of Secondary Battery]

An electrode assembly was prepared by attaching lead wires respectively to the above-described positive electrode and a counter electrode made of Li metal, and by arranging the positive electrode and the counter electrode facing each other via a polyolefin separator. This electrode assembly and the above-described non-aqueous electrolyte solution were sealed in an outer housing made of an aluminum laminate film, and a test cell was thereby produced.

Example 2

A positive electrode and a test cell were prepared in the same manner as in Example 1 except that, in synthesizing the positive electrode active material, the added amount of lithium iodide was set to 30% by atomic ratio.

Example 3

A positive electrode and a test cell were prepared in the same manner as in Example 1 except that, in synthesizing the positive electrode active material, the added amount of lithium iodide was set to 50% by atomic ratio.

Example 4

A positive electrode and a test cell were prepared in the same manner as in Example 1 except that, in synthesizing the positive electrode active material, lithium hydroxide was added, instead of lithium iodide, at an atomic ratio of 500%.

Comparative Example 1

In synthesizing the positive electrode active material, $NiSO_4$ and $MnSO_4$ were mixed in an aqueous solution so as to attain a stoichiometric ratio of 50:50, and coprecipitation was allowed to occur, so that (Ni, Mn)(OH)$_2$ serving as a precursor was obtained. Next, this precursor and $LiOH.H_2O$ were mixed such that (Ni+Mn):Li satisfied a stoichiometric ratio of 1.00:1.08. This mixture was maintained at 900° C. for 10 hours, and a composite oxide was thereby synthesized. A positive electrode and a test cell were prepared in the same manner as in Example 1 except that this composite oxide was used as the positive electrode active material.

Comparative Example 2

In synthesizing the positive electrode active material, $Cl_3O_4$ particles were added to the precursor at a stoichiometric ratio of 10%, and were caused to combine at the surface of the precursor in a mortar. Subsequently, $LiOH.H_2O$ was mixed such that (Ni+Co+Mn):Li satisfied a stoichiometric ratio of 1.00:1.08. This mixture was maintained at 900° C. for 10 hours, and a composite oxide was thereby synthesized. A positive electrode and a test cell were prepared in the same manner as in Example 1 except that this composite oxide was used as the positive electrode active material.

Comparative Example 3

A positive electrode and a test cell were prepared in the same manner as in Example 1 except that, in synthesizing the positive electrode active material, no lithium iodide was added.

[Evaluation of Positive Electrode Active Material]

XRD measurement was carried out for each of the synthesized positive electrode active materials to thereby identify the crystal structure. The results showed that, in the positive electrode active materials of Comparative Examples 1 and 2, O3 structure belonging to the space group R-3m was the main structure, and in the positive electrode active materials of Comparative Examples 3 and Examples 1 to 4, O2 structure belonging to the space group $P6_3mc$ was the main structure. Next, the composition of each of the synthesized positive electrode active materials was analyzed using ICP, and the number of moles of each metal element relative to the total number of moles of metal elements excluding Li was calculated to determine Co1 and Mn1 of each material. Further, the surface composition of each positive electrode active material was analyzed using XPS, and the number of moles of each metal element relative to the total number of moles of metal elements excluding Li was calculated to determine Co2 and Mn2 of each material. Furthermore, by performing XPS measurement after carrying out etching with Ar ions, the thickness of the region having unevenly densely distributed Co as observed from the particle surface was measured, and it was found that, in all of the materials except the positive electrode active materials of Comparative Examples 1 and 3, the thickness of the unevenly densely distributed region having a higher Co concentration than the other regions was 100 nm or greater from the particle surface.

The formal oxidation number of Co in each positive electrode active material was determined by titration. Specifically, first, potassium iodide and sulfuric acid were added to each material. The mixture was shaken with an ultrasonic cleaner and then allowed to stand in a dark place, so as to cause dissolution and to liberate iodine. Next, into the solution prepared as described above, sodium thiosulfate was titrated, and based on the amount required for reaction, the amount of liberated iodine was determined. Assuming that each metal element was reduced to divalent by potassium iodide, based on the amount of liberated iodine, the formal oxidation numbers of the metals when O in each material was divalent were calculated, and the formal oxidation number of Co was calculated assuming that Ni was divalent and Mn was tetravalent. The values of Co2/Co1, Mn2/Mn1, and formal oxidation number of Co determined as described above were as shown in Table 1.

[Evaluation of Positive Electrode Capacity and Capacity Retention Rate (Cycle Characteristics)]

Each of the test cells of the Examples and the Comparative Examples was charged and discharged according to the below-described conditions in a temperature environment of 25° C., and the positive electrode capacity (i.e., the discharge capacity in the first cycle) and the capacity retention rate after charge/discharge cycles were determined.

<Charge/Discharge Conditions>

Charging was performed with a constant current of 0.05 C until reaching 4.7 V, and then discharging was performed with a constant current of 0.05 C until reaching 2.5 V. This charging/discharging process was performed for 10 cycles, and the capacity retention rate was calculated by the following formula.

Capacity retention rate (%)=Discharge capacity in the 10th cycle÷Discharge capacity in the 1st cycle×100

TABLE 1

| | Positive Electrode Active Material | | | | Positive Electrode | |
|---|---|---|---|---|---|---|
| | Structure | Co2/ Co1 | Mn2/ Mn1 | Formal Oxidation Number of Co | Capacity mAh/g | Capacity Retention Rate % |
| Comparative Example 1 | O3 | 1 | 1 | — | 220.5 | — |
| Comparative Example 2 | O3 | >1 | <1 | — | 206.9 | — |
| Comparative Example 3 | O2 | 0.90 | 1.00 | 3.41 | 249.4 | 89.4 |
| Example 1 | O2 | 2.38 | 0.76 | 2.81 | 282.9 | 93.4 |
| Example 2 | O2 | 2.55 | 0.75 | 2.81 | 266.4 | 91.6 |
| Example 3 | O2 | 3.45 | 0.61 | 2.81 | 267.1 | 95.0 |
| Example 4 | O2 | 5.31 | 0.39 | 2.81 | 256.7 | 94.4 |

As shown in Table 1, all of the positive electrodes of the Examples have a higher capacity and superior cycle characteristics (i.e., a higher capacity retention rate) than the positive electrodes of the Comparative Examples. By using the positive electrode active materials of the Examples, secondary batteries simultaneously achieving high capacity and good cycle characteristics can be provided.

REFERENCE SIGNS LIST 10 secondary battery
11 positive electrode
12 negative electrode
13 separator
14 electrode assembly
16 outer can
17 sealing assembly
18, 19 insulation plate
20 positive electrode lead
21 negative electrode lead
22 grooved portion
23 internal terminal plate
24 lower valve member
25 insulation member
26 upper valve member
27 cap
28 gasket

The invention claimed is:

1. A positive electrode active material for secondary battery, containing a lithium transition metal composite oxide, wherein
the lithium transition metal composite oxide is represented by general formula $Li_\alpha[Li_xMn_yCo_zMe_{(1-x-y-z)}]O_2$ (where Me is at least one selected from Ni, Fe, Ti, Bi, and Nb, and $0.5<\alpha<1$, $0.05<x<0.25$, $0.4<y<0.7$, and $0<z<0.25$ hold true), and has at least one crystal structure selected from O2 structure, T2 structure, and O6 structure, and
a ratio (Co2/Co1) of a Co molar ratio (Co2) at a surface of the oxide to a Co molar ratio (Co1) in the entire lithium transition metal composite oxide satisfies $1.2<(Co2/Co1)<6.0$,
wherein the O2 structure constitutes at least 50 vol. % of an entire crystal structure of the lithium transition metal composite oxide.

2. The positive electrode active material for secondary battery according to claim 1, wherein a ratio (Mn2/Mn1) of a Mn molar ratio (Mn2) at the surface of the oxide to a Mn molar ratio (Mn1) in the entire lithium transition metal composite oxide satisfies $0.5<(Mn2/Mn1)<1.0$.

3. The positive electrode active material for secondary battery according to claim 1, wherein, a valence of Co is less than 3 as calculated where Me in the general formula is Ni, Ni is divalent, Mn is tetravalent, and O is divalent.

4. The positive electrode active material for secondary battery according to claim 1, wherein a region where Co concentration is increased has a thickness of 20 nm or greater from the surface of the oxide.

5. A secondary battery comprising a positive electrode containing the positive electrode active material for secondary battery according to claim 1, a negative electrode, and an electrolyte.

* * * * *